United States Patent

[11] 3,617,689

| [72] | Inventor | August Frederick Manz |
| | | Union, N.J. |
| [21] | Appl. No. | 1,693 |
| [22] | Filed | Jan. 9, 1970 |
| [45] | Patented | Nov. 2, 1971 |
| [73] | Assignee | Union Carbide Corporation |
| | | New York, N.Y. |

[54] CONSTANT POTENTIAL AC CONSUMABLE ELECTRODE WELDING
6 Claims, 2 Drawing Figs.

[52] U.S. Cl. .................................................. 219/131 R, 315/276
[51] Int. Cl. .................................................. B23k 9/10
[50] Field of Search .................................... 219/131, 137; 323/94; 315/166, 205, 239, 244, 276, 289

[56] References Cited
UNITED STATES PATENTS

| 1,922,984 | 8/1933 | Soundy | 315/244 |
| 2,097,327 | 10/1937 | Hunter | 315/239 |
| 2,130,077 | 9/1938 | Dorgelo | 315/244 X |
| 2,301,671 | 11/1942 | Abadie | 314/244 X |
| 2,301,891 | 11/1942 | Lecorguillier | 315/244 X |
| 2,305,474 | 12/1942 | Hays, Jr. | 315/276 X |
| 2,472,323 | 6/1944 | Welch, Jr. | 315/205 X |
| 3,117,215 | 1/1964 | Ramsey | 219/131 X |

FOREIGN PATENTS

| 570,585 | 9/1958 | Belgium | 219/131 |

Primary Examiner—J. V. Truhe
Assistant Examiner—George A. Montanye
Attorneys—Paul A. Rose, Thomas I. O'Brien, Dominic J. Terminello and Eugene Lieberstein ABSTRACT: A method of establishing a self-supporting AC arc between a consumable electrode and a workpiece from a constant potential source of power comprising interposing an equivalent circuit consisting of a series-connected inductor and capacitor in series circuit relationship with the constant potential source and critically tuning the inductance and capacitance into an essentially resonant state.

PATENTED NOV 2 1971  3,617,689

INVENTOR
AUGUST F. MANZ
BY
ATTORNEY

CONSTANT POTENTIAL AC CONSUMABLE ELECTRODE WELDING

This invention relates to AC consumable electrode arc working and more particularly to a method and apparatus for starting and maintaining a self-supporting AC arc between an electrode and a workpiece from a constant potential source of power.

Alternating current arcs extinguish at the end of each half cycle of current flow. To reignite the arc a sufficient voltage must be applied to "break down" the arc gap. There are several ways in which the gap can be broken down to cause reignition of the AC arc. One way is to superimpose a high-frequency voltage across the gap. This method is used commercially in almost all Tig AC power supplies. It is commonly referred to as high-frequency (HF) stabilization. Another way is to derive the welding current from a power supply having a sufficient open-circuit voltage to cause the gap to break down at the end of each half cycle. This method is used in almost all balanced wave AC power supplies. An open circuit of approximately 125 to 160 volts AC has been found sufficient for most applications. Still another way is to cause the required breakdown potential to be lowered by changing the arc environment. This method is employed in covered electrodes and submerged arc systems. Chemical compounds are added to the flux in order to lower the arc reignition potential.

In spite of the existence of these methods for stabilizing AC arcs, the use of consumable electrode automatic or semiautomatic welding systems has been limited.

The problems associated with these known methods of arc reignition limit their usefulness. HF can cause insulation breakdown as well as communications interference. High open-circuit voltages are considered hazardous for manual welding. Voltages which are considered safe are too low to be effective. Material changes in the arc environment limit the use of this method to welding where the changes are not detrimental to the welds.

As a consequence there has been an insignificant development of automatic or semiautomatic AC consumable electrode welding systems. In contrast to AC welding, there has been significant process development in DC automatic and semiautomatic welding. The development of DC welding has been possible because a DC arc once ignited does not extinguish readily.

Consumable electrode DC welding can be divided into two major classifications based on the type of DC power used. These are the so-called constant potential or "CP" and the constant current or "CC" welding systems. The CC system is sometimes referred to as the conventional system. Entire welding technologies and businesses are based on the two types of DC arc welding. The apparatus and controls used in both the CP and CC systems are based on radically different functional concepts. In a CP system a constant speed wire drive system is used. In a CC system a variable speed drive is used. In CP the arc length is predominantly controlled by the power supply setting while in CC the arc length or voltage is predominantly controlled by the wire feed speed. In CC the arc current is predominantly controlled by the power supply setting while in CP the arc current is predominantly controlled by the wire feed speed. All of the aforementioned differences are well known in the art of DC arc welding. Equipment is available in large quantity and variety to perform the required DC arc welding functions.

This is not true of AC consumable electrode arc welding particularly when welding with AC constant potential power. There is a limited amount of CC automatic and semiautomatic welding equipment available. Such equipment is used mainly for processes wherein a flux system is used to lower the arc reignition potential. Most of the AC consumable electrode welding equipment is of the CC variety. There is little CPAC arc welding at all and all of the known systems employ a flux for arc stabilization.

Alternating current constant potential welding sources would have many advantages over conventional power sources from the standpoint of cost, simplicity of control and foremost because of the automatic self-regulation characteristic inherent in a constant potential source of power.

The present invention is directed to a method and apparatus for AC consumable electrode arc welding wherein the arc may be started and reliably maintained by application of a constant potential source of power. For purposes of the present disclosure the term CP is used in the same sense as conventionally applied in DC welding technology.

The present invention is also directed to electric arc AC constant potential power supply apparatus for reliably starting and maintaining an AC arc between a consumable electrode and a workpiece.

In accordance with the present invention it has been found that an AC arc may be established and reliably maintained between a consumable electrode and a workpiece from a constant potential source of power by interposing an equivalent circuit consisting of a series-connected inductor and capacitor in series circuit relationship with the constant potential source and critically tuning the inductance and capacitance into an essentially resonant state. In addition, the capacitive reactance must be selected to equal at least the minimum voltage necessary to support arc reignition at each instant of arc extinction divided by the operating current.

Other advantages of the present invention will become apparent to those skilled in the art in the light of the following description and accompanying drawings of which:

Figure 1:
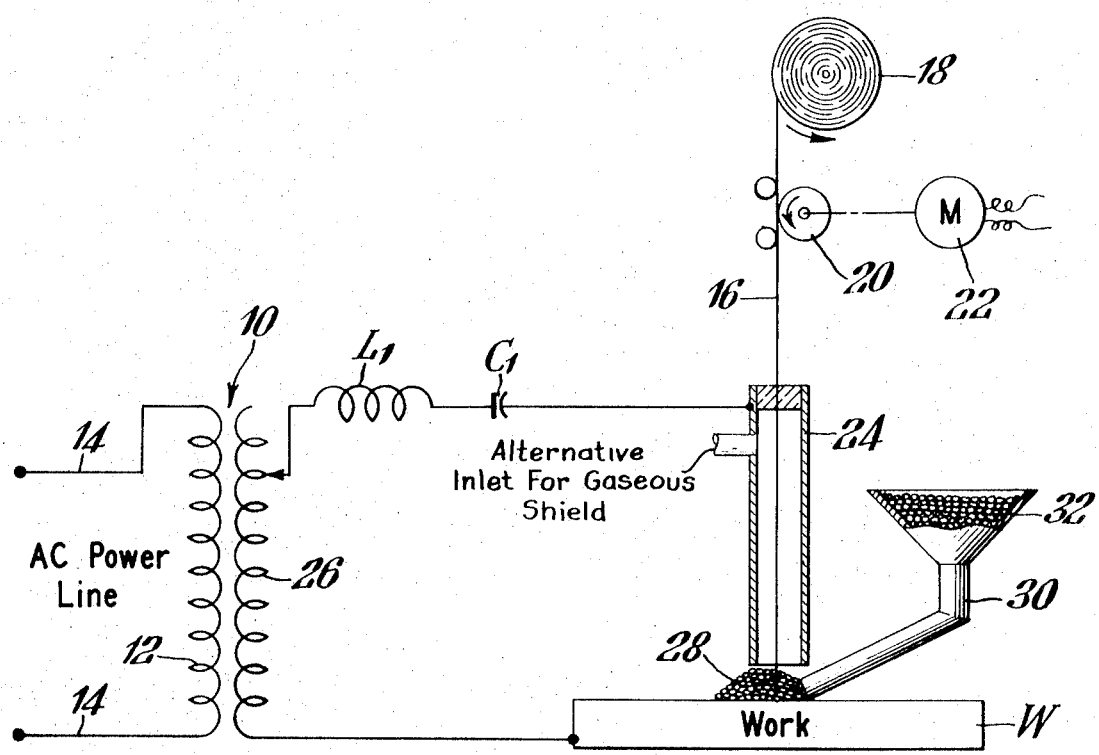
FIG. 1 is a diagrammatic illustration of a submerged arc welding setup in accordance with the present invention.

Referring now to FIG. 1 of the drawings, an AC constant potential arc welding submerged electrode system is illustrated including a transformer 10 having an adjustable secondary winding 26 connected to power lines 14 which may in turn be connected to any conventional alternating current power distribution source. A consumable electrode composed of metal in the form of a wire or rod 16 is drawn from a reel 18 by means of a feed roll 20 which is driven by a motor 22 and thereby fed through a contact tub 24 toward the work W to be welded. Electrode 16 is connected in series circuit relationship with the secondary 26 of transformer 10, the work W, inductor $L_1$ and capacitor $C_1$.

Granular welding composition 28 is delivered to the welding site by gravity through a pipe 30 from a hopper 32 containing a supply of such composition.

The shielding medium could alternatively be gaseous and fed through inlet 34. Transformer 10 is wound to provide an essentially constant output across the secondary winding 26 irrespective of the current drawn therefrom by the arc circuit. The secondary winding 26 may be selectively adjusted to provide any desired output voltage across the secondary winding 26 as determined by the turns ratio between the primary and secondary windings of the transformer. Additional circuit means may be added to regulate the output of transformer 10 if deemed necessary.

The combination of inductor $L_1$ and capacitor $C_1$ represent a passive reactance network whose principal function is to provide a voltage at each instant of arc extinction which will support instantaneous arc reignition. Capacitor $C_1$ draws its energy from both the source and inductor $L_1$ and can achieve at the instant of arc extinction any desired predetermined voltage depending solely upon the magnitudes of the inductance, capacitance and operating current for any given source frequency. In accordance with the present invention it is critical for the inductive reactance of the circuit to be rendered substantially equal to the capacitive reactance. Inductive reactance and capacitive reactance although well-known terms are reproduced below for purposes of completeness:

$X_L$ (inductive reactance) $= 2\pi fL$ $X_C$ (capacitive reactance) $= 1/2\pi fC$ A deviation from the critical condition of resonance where $X_L$ equals $X_C$ will impair the constant potential source of power is one in which the output voltage is constant at all current levels. Since a slight slope in the volt-ampere characteristic as in DC welding will not materially affect the welding operation, a power source is said to be of constant potential for purposes of the present invention when the volt-ampere slope is less than about 5 volts per 100 amperes. Hence, although the term "critical" has been employed it is intended only to mean that the reactance network of $L_1$ and $C_1$ be sufficiently tuned to preserve the constant potential characteristics of the circuit in accordance with the above definition. Moreover, by maintaining this critically tuned relationship between the inductive and capacitive reactance it has been found that the arc may be started by feeding the electrode into direct contact with the work as in the manner of DC arc welding without auxiliary starting means. The electrode will then burn back to a proper arc length which through self-regulation will be automatically maintained. A more thorough explanation of self-regulation with a constant potential arc is described at length in the Welding Research Council Bulletin No. 97 dated July 1964, by R.L. Hackman and A.F. Manz. In addition, it has been discovered that when the reactance network of $L_1$ and $C_1$ is properly tuned it forms a filter network passing the tuned frequency while attenuating all the other frequencies. Hence, a distorted incoming waveform will tend to be converted by the filter reactance network into a sinusoidal waveform. This promotes arc stability in cases where harmonic distortion in the AC waveform would otherwise cause arc instability.

For proper AC stabilization using a constant potential source of power not only must the inductive reactance and the capacitive reactance be tuned but the magnitude of the capacitor must be properly chosen such that its stored voltage at the instant of arc extinction is sufficient to support arc reignition. A quantitative determination of the capacitive reactance can be made by dividing the magnitude of voltage necessary to support arc reignition by the operating current. The so-called "necessary voltage" to support arc reignition is a qualitative assessment determined from experience. The necessary reignition voltage varies with the shielding medium or flux employed, the electrode and the workpiece, the arc length, etc.; and usually falls between 70–160 volts.

In order to achieve arc stability in accordance with the teachings of the present invention it may be necessary in some instances, because of present-day component limitation, to use multiple capacitors, i.e., a condenser bank, and/or multiple inductors in the aforementioned reactance network. Therefore, the invention is intended to embrace the use of any reactance network whose functional equivalent may be represented by a series connected inductor and capacitor.

The feasibility of the present invention was successfully demonstrated in a series of bead-on-plate deposits using a constant potential AC power supply and a submerged arc welding setup substantially as shown in the drawing. A conventional grade flux was employed. The consumable electrode used was of 3/32 inch diameter. The average operating current ranged between 250–400 amperes while the voltage was maintained constant at varying levels between 25 to 35 volts. The reactance network consisted of an inductor of approximately 820 $\mu$ henries connected in series with a bank of nonpolar condensers. The bank of condensers consisted of 10 parallel rows with two series-connected condensers in each row. The results of the bead-on-plate tests showed stable operation and the weld had a satisfactory surface appearance. Further tests were made with various different conventional grades of flux all of which produced substantially similar weld deposits and all exhibited stable performance.

Figure 2:
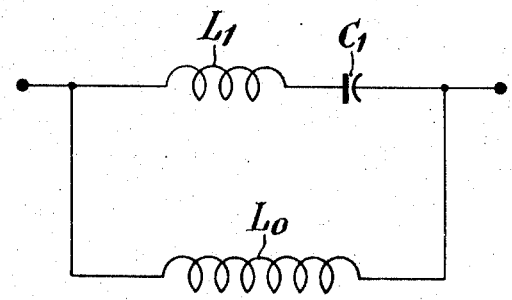
FIG. 2 shows an alternative network arrangement for that employed in FIG. 1.

The capacitive element $C_1$ in the reactance network of the present invention prevents direct current from passing causing the arc in all cases to be balanced. A balanced arc is not, however, in all instances desirable. The reactance network shown in FIG. 2 permits naturally occurring direct current to pass while otherwise performing the same function as the reactance network in FIG. 1. This is accomplished by adding an inductor $L_o$ in parallel with the series network of FIG. 1. The parallel connected inductor $L_o$ permits the passage of the naturally occurring DC component of arc current which would otherwise be blocked by the capacitor $C_1$. As a design criterion the inductor $L_o$ should be selected with as low a DC resistance as possible and an inductive reactance or impedance much larger than the combined impedance of $C_1$ and $L_1$, such that the proportion of AC current that flows through $L_o$ will be small in comparison to that flowing through $C_1$ and $L_1$. Since the functional characteristics of the network of FIG. 2 may be duplicated by application of conventional network theory the invention is intended to cover any reactance network consisting of a series-connected inductor and capacitor first equivalent circuit and a second equivalent circuit consisting essentially of an inductor connected in parallel with said first equivalent circuit.

What is claimed is:

1. A method of AC arc working in which a consumable electrode is continuously fed toward a workpiece to be welded and wherein the sole source of impressed power is an alternating current source of constant potential comprising: connecting a reactance network in series circuit relationship with said alternating current source of constant potential, the electrode and the workpiece, said reactance network consisting of a series equivalent circuit of an inductor and capacitor; and turning said equivalent circuit into an essentially resonant condition at the alternating current source frequency such that the following criterion is met:

$IX_L = IX_C = V_S$ where $X_L =$ inductive reactance $X_C =$ capacitive reactance $I =$ operating current $V_S =$ minimum voltage necessary to support arc reignition at each instant of arc extinction; whereby, auxiliary means for establishing and maintaining an AC arc between the electrode and workpiece is rendered unnecessary.

2. A method as defined in claim 1 further including depositing a blanket of granular flux composition over the area of said workpiece to be welded.

3. A method as defined in claim 1 further including shielding said consumable electrode by a gaseous medium.

4. A method of AC arc working in which a consumable electrode is continuously fed toward a workpiece to be welded and wherein the sole source of impressed power is an alternating current source of constant potential comprising: connecting a reactance network in series circuit relationship with said alternating current source of constant potential, the electrode and the workpiece, said reactance network consisting of a series-connected inductor and capacitor first equivalent circuit and a second equivalent circuit consisting essentially of an inductor connected in parallel with said first equivalent circuit; and turning said first equivalent circuit into an essentially resonant condition at the alternating current source frequency such that the following criterion is met for said first equivalent circuit:

$IX_L = IX_C = V_S$ where $X_L =$ inductive reactance $X_C =$ capacitive reactance $I =$ operating current $V_S =$ minimum voltage necessary to support arc reignition at each instant of arc extinction whereby, auxiliary means for establishing and maintaining an AC arc between the electrode and workpiece is rendered unnecessary.

5. In an AC welding power supply apparatus automatically establishing and maintaining an AC arc between a consumable electrode which is being continuously fed toward a workpiece and said workpiece the improvement comprising: an alternating current constant potential source of power having a static volt-ampere characteristic curve with a slope of less than about 5 volts per 100 amperes; and a reactance network electrically coupled to the output of said source of power and said consumable electrode, said reactance network consisting of a series equivalent circuit of an inductor and capacitor tuned to resonate at the alternating current source frequency such that the following criterion is met for said equivalent circuit $IX_L = IX_C = V_S$ where $X_L$ = inductive reactance
$X_C$ = capacitive reactance
$I$ = operating current
$V_S$ = minimum voltage necessary to support arc reignition at each instant of arc extinction.

6. AC welding power supply apparatus as defined in claim 5 wherein said constant potential source of power comprises an AC transformer having a secondary output winding and means for selectively adjusting the output voltage across said secondary output winding.

* * * * *

PO-1050
(5/69)

UNITED STATES PATENT OFFICE
CERTIFICATE OF CORRECTION

Patent No. 3,617,689    Dated November 2, 1971

Inventor(s) A. F. Manz

It is certified that error appears in the above-identified patent and that said Letters Patent are hereby corrected as shown below:

On page 3, column 3, line 4 the following phrase was omitted --- characteristics of the circuit. Theoretically a constant potential --- between the words "potential" and "source."

Signed and sealed this 11th day of April 1972.

(SEAL)
Attest:

EDWARD M. FLETCHER, JR.
Attesting Officer

ROBERT GOTTSCHALK
Commissioner of Patents